(12) United States Patent
Mulliken

(10) Patent No.: US 9,399,322 B2
(45) Date of Patent: Jul. 26, 2016

(54) THREE DIMENSIONAL PRINTER WITH REMOVABLE, REPLACEABLE PRINT NOZZLE

(71) Applicant: MakerBot Industries, LLC, Brooklyn, NY (US)

(72) Inventor: Harry Elliot Mulliken, Hamilton, NJ (US)

(73) Assignee: MakerBot Industries, LLC, Brooklyn, NY (US)

( * ) Notice: Subject to any disclaimer, the term of this patent is extended or adjusted under 35 U.S.C. 154(b) by 52 days.

(21) Appl. No.: 13/962,055

(22) Filed: Aug. 8, 2013

(65) Prior Publication Data

US 2014/0044822 A1 Feb. 13, 2014

Related U.S. Application Data

(60) Provisional application No. 61/680,989, filed on Aug. 8, 2012.

(51) Int. Cl.
*B29C 67/00* (2006.01)
*G06F 17/50* (2006.01)
*H04N 1/00* (2006.01)

(52) U.S. Cl.
CPC ......... *B29C 67/0088* (2013.01); *B29C 67/0051* (2013.01); *B29C 67/0055* (2013.01); *G06F 17/5009* (2013.01); *H04N 1/00827* (2013.01)

(58) Field of Classification Search
CPC ............ B29C 67/0051; B29C 67/0055; B29C 67/0088; H04N 1/00827; G06F 17/5009
USPC ................................................... 425/113, 375
See application file for complete search history.

(56) References Cited

U.S. PATENT DOCUMENTS

| | | | | |
|---|---|---|---|---|
| 3,918,867 | A * | 11/1975 | Beyer | 425/174 |
| 4,306,243 | A * | 12/1981 | Taub et al. | 347/75 |
| 4,334,637 | A | 6/1982 | Baker et al. | |
| 5,576,032 | A | 11/1996 | Lupke | |
| 6,085,957 | A * | 7/2000 | Zinniel et al. | 226/8 |
| 8,827,684 | B1 * | 9/2014 | Schumacher et al. | 425/375 |
| 2002/0111707 | A1 * | 8/2002 | Li et al. | 700/118 |
| 2003/0056870 | A1 * | 3/2003 | Comb et al. | 156/64 |
| 2004/0246311 | A1 * | 12/2004 | Silverbrook | 347/57 |
| 2004/0250760 | A1 * | 12/2004 | Goto | 118/300 |
| 2005/0046663 | A1 * | 3/2005 | Silverbrook | 347/20 |
| 2008/0231669 | A1 * | 9/2008 | Brost | 347/75 |
| 2009/0273122 | A1 * | 11/2009 | Batchelder et al. | 264/401 |
| 2009/0295032 | A1 * | 12/2009 | Hopkins | 264/308 |
| 2010/0239785 | A1 * | 9/2010 | Planta Torralba et al. | 427/600 |
| 2013/0241102 | A1 * | 9/2013 | Rodgers et al. | 264/132 |
| 2014/0048969 | A1 * | 2/2014 | Swanson et al. | 264/129 |
| 2014/0120197 | A1 * | 5/2014 | Swanson et al. | 425/378.1 |
| 2014/0141166 | A1 * | 5/2014 | Rodgers | 427/256 |
| 2014/0159284 | A1 * | 6/2014 | Leavitt | 264/401 |

* cited by examiner

*Primary Examiner* — Yogendra Gupta
*Assistant Examiner* — Sean S Luk
(74) *Attorney, Agent, or Firm* — Strategic Patents, P.C.

(57) ABSTRACT

A three dimensional printer with a removable, replaceable extrusion nozzle is disclosed.

16 Claims, 4 Drawing Sheets

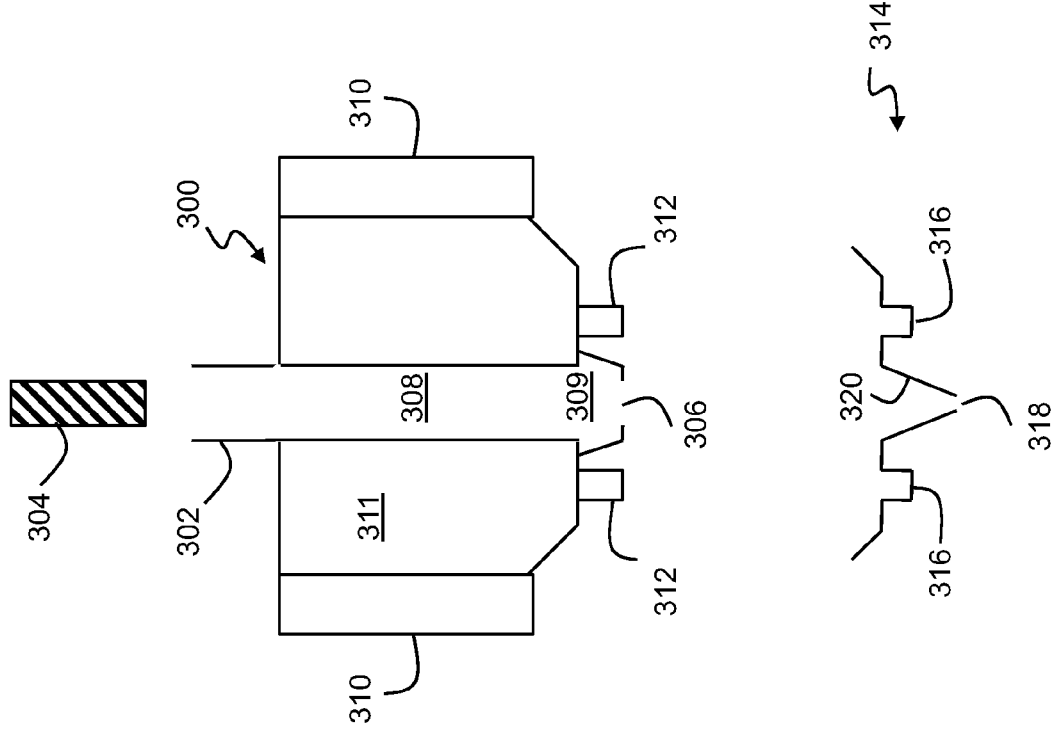

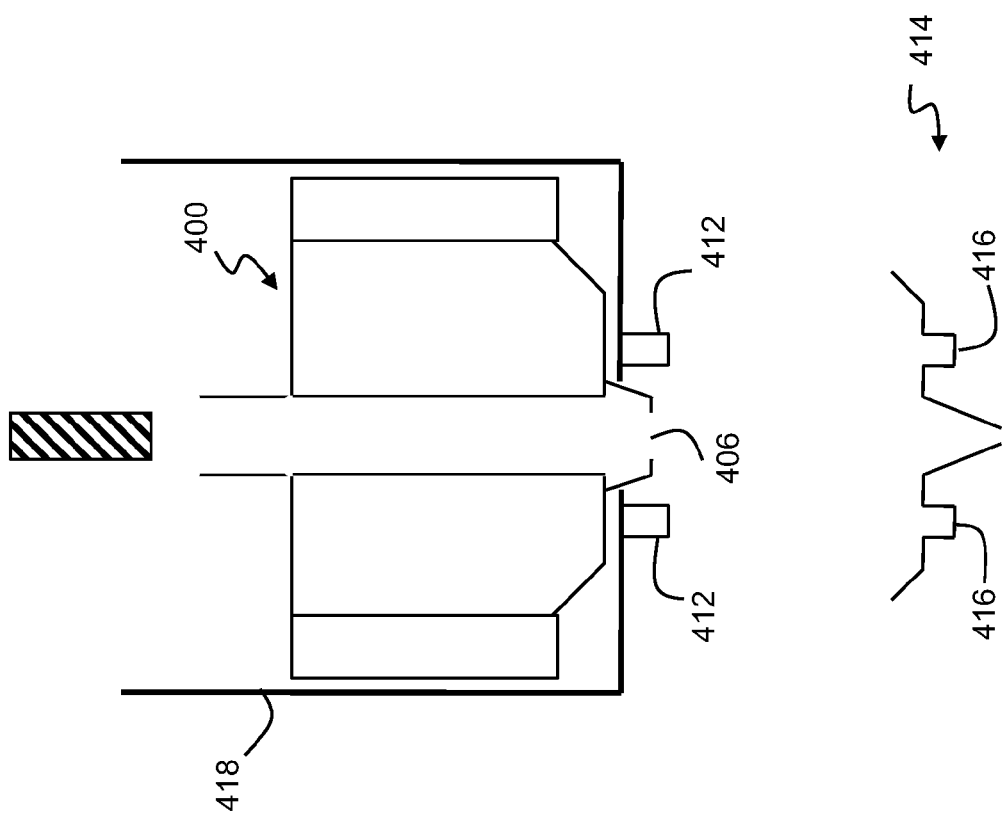

THREE DIMENSIONAL PRINTER WITH REMOVABLE, REPLACEABLE PRINT NOZZLE

RELATED APPLICATIONS

This application claims the benefit of U.S. Prov. App. No. 61/680,989 filed on Aug. 8, 2012, the entire content of which is hereby incorporated by reference.

BACKGROUND

Certain three dimensional printers extrude a build material, such as partially melted plastic, through a nozzle of a print head. During a print error or other malfunction, the nozzle can become jammed with build material. In some cases, clearing the nozzle can be a time consuming or frustrating task for the operator of the three dimensional printer.

SUMMARY

A three dimensional printer with a removable, replaceable extrusion nozzle is disclosed.

BRIEF DESCRIPTION OF THE FIGURES

The invention and the following detailed description of certain embodiments thereof may be understood by reference to the following figures:

FIG. 3 shows a cross section of an extrusion head and nozzle.

FIG. 4 shows a cross section of an extrusion head and nozzle.

DETAILED DESCRIPTION

All documents mentioned herein are hereby incorporated in their entirety by reference. References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Thus the term "or" should generally be understood to mean "and/or" and so forth.

The following description emphasizes three-dimensional printers using fused deposition modeling or similar techniques where a bead of material is extruded in a layered series of two dimensional patterns as "roads," "paths" or the like to form a three-dimensional object from a digital model. It will be understood, however, that numerous additive fabrication techniques are known in the art including without limitation multijet printing, stereolithography, Digital Light Processor ("DLP") three-dimensional printing, selective laser sintering, and so forth. Such techniques may benefit from the systems and methods described below, and all such printing technologies are intended to fall within the scope of this disclosure, and within the scope of terms such as "printer", "three-dimensional printer", "fabrication system", and so forth, unless a more specific meaning is explicitly provided or otherwise clear from the context.

Figure 1:
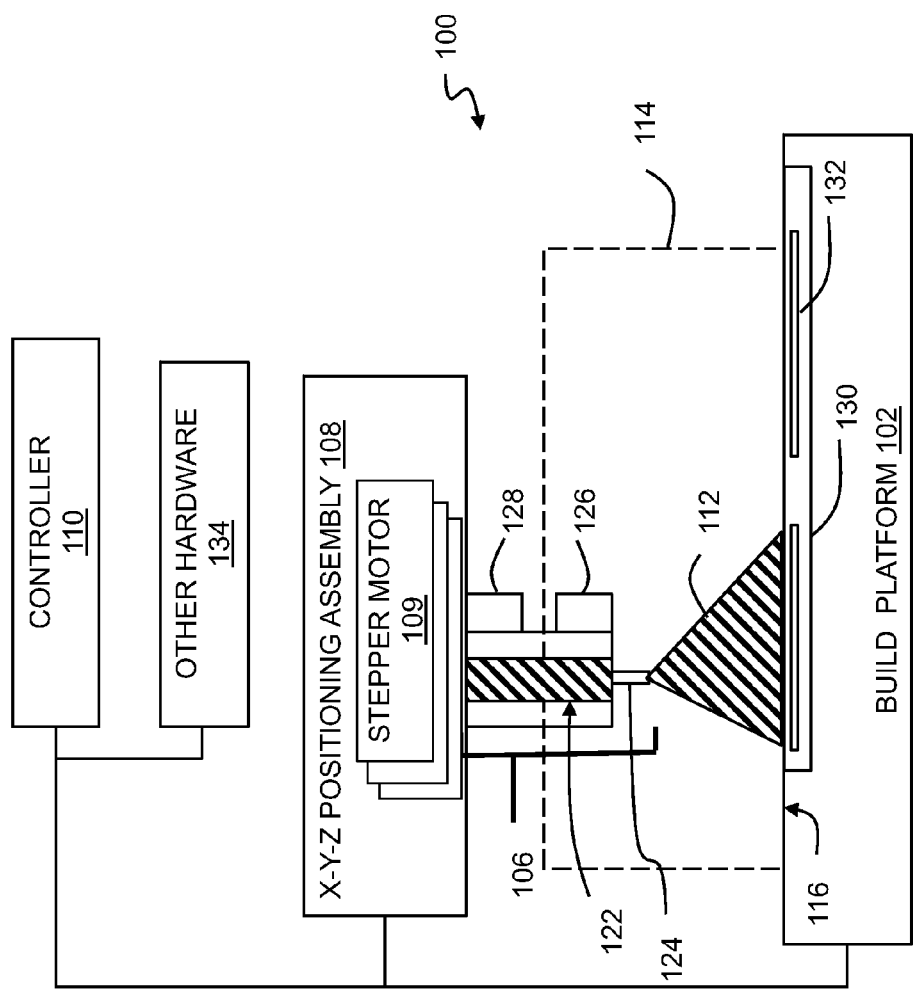
FIG. 1 is a block diagram of a three-dimensional printer.

FIG. 1 is a block diagram of a three-dimensional printer. In general, the printer 100 may include a build platform 102, an extruder 106, an x-y-z positioning assembly 108, and a controller 110 that cooperate to fabricate an object 112 within a working volume 114 of the printer 100.

The build platform 102 may include a surface 116 that is rigid and substantially planar. The surface 116 may provide a fixed, dimensionally and positionally stable platform on which to build the object 112. The build platform 102 may include a thermal element 130 that controls the temperature of the build platform 102 through one or more active devices 132, such as resistive elements that convert electrical current into heat, Peltier effect devices that can create a heating or cooling affect, or any other thermoelectric heating and/or cooling devices. The thermal element 130 may be coupled in a communicating relationship with the controller 110 in order for the controller 110 to controllably impart heat to or remove heat from the surface 116 of the build platform 102.

The extruder 106 may include a chamber 122 in an interior thereof to receive a build material. The build material may, for example, include acrylonitrile butadiene styrene ("ABS"), high-density polyethylene ("HDPL"), polylactic acid ("PLA"), or any other suitable plastic, thermoplastic, or other material that can usefully be extruded to form a three-dimensional object. The extruder 106 may include an extrusion tip 124 or other opening that includes an exit port with a circular, oval, slotted or other cross-sectional profile that extrudes build material in a desired cross-sectional shape.

The extruder 106 may include a heater 126 (also referred to as a heating element) to melt thermoplastic or other meltable build materials within the chamber 122 for extrusion through an extrusion tip 124 in liquid form. While illustrated in block form, it will be understood that the heater 126 may include, e.g., coils of resistive wire wrapped about the extruder 106, one or more heating blocks with resistive elements to heat the extruder 106 with applied current, an inductive heater, or any other arrangement of heating elements suitable for creating heat within the chamber 122 sufficient to melt the build material for extrusion. The extruder 106 may also or instead include a motor 128 or the like to push the build material into the chamber 122 and/or through the extrusion tip 124.

In general operation (and by way of example rather than limitation), a build material such as ABS plastic in filament form may be fed into the chamber 122 from a spool or the like by the motor 128, melted by the heater 126, and extruded from the extrusion tip 124. By controlling a rate of the motor 128, the temperature of the heater 126, and/or other process parameters, the build material may be extruded at a controlled volumetric rate. It will be understood that a variety of techniques may also or instead be employed to deliver build material at a controlled volumetric rate, which may depend upon the type of build material, the volumetric rate desired, and any other factors. All such techniques that might be suitably adapted to delivery of build material for fabrication of a three-dimensional object are intended to fall within the scope of this disclosure.

The x-y-z positioning assembly 108 may generally be adapted to three-dimensionally position the extruder 106 and the extrusion tip 124 within the working volume 114. Thus by controlling the volumetric rate of delivery for the build material and the x, y, z position of the extrusion tip 124, the object 112 may be fabricated in three dimensions by depositing successive layers of material in two-dimensional patterns derived, for example, from cross-sections of a computer model or other computerized representation of the object 112. A variety of arrangements and techniques are known in the art to achieve controlled linear movement along one or more axes. The x-y-z positioning assembly 108 may, for example, include a number of stepper motors 109 to independently control a position of the extruder 106 within the working volume along each of an x-axis, a y-axis, and a z-axis. More generally, the x-y-z positioning assembly 108 may include without limitation various combinations of stepper motors, encoded DC motors, gears, belts, pulleys, worm gears, threads, and so forth. For example, in one aspect the build platform 102 may be coupled to one or more threaded rods by a threaded nut so that the threaded rods can be rotated to provide z-axis positioning of the build platform 102 relative to the extruder 124. This arrangement may advantageously simplify design and improve accuracy by permitting an x-y positioning mechanism for the extruder 124 to be fixed relative to a build volume. Any such arrangement suitable for controllably positioning the extruder 106 within the working volume 114 may be adapted to use with the printer 100 described herein.

In general, this may include moving the extruder 106, or moving the build platform 102, or some combination of these. Thus it will be appreciated that any reference to moving an extruder relative to a build platform, working volume, or object, is intended to include movement of the extruder or movement of the build platform, or both, unless a more specific meaning is explicitly provided or otherwise clear from the context. Still more generally, while an x, y, z coordinate system serves as a convenient basis for positioning within three dimensions, any other coordinate system or combination of coordinate systems may also or instead be employed, such as a positional controller and assembly that operates according to cylindrical or spherical coordinates.

The controller 110 may be electrically or otherwise coupled in a communicating relationship with the build platform 102, the x-y-z positioning assembly 108, and the other various components of the printer 100. In general, the controller 110 is operable to control the components of the printer 100, such as the build platform 102, the x-y-z positioning assembly 108, and any other components of the printer 100 described herein to fabricate the object 112 from the build material. The controller 110 may include any combination of software and/or processing circuitry suitable for controlling the various components of the printer 100 described herein including without limitation microprocessors, microcontrollers, application-specific integrated circuits, programmable gate arrays, and any other digital and/or analog components, as well as combinations of the foregoing, along with inputs and outputs for transceiving control signals, drive signals, power signals, sensor signals, and so forth. In one aspect, this may include circuitry directly and physically associated with the printer 100 such as an on-board processor. In another aspect, this may be a processor associated with a personal computer or other computing device coupled to the printer 100, e.g., through a wired or wireless connection. Similarly, various functions described herein may be allocated between an on-board processor for the printer 100 and a separate computer. All such computing devices and environments are intended to fall within the meaning of the term "controller" or "processor" as used herein, unless a different meaning is explicitly provided or otherwise clear from the context.

A variety of additional sensors and other components may be usefully incorporated into the printer 100 described above. These other components are generically depicted as other hardware 134 in FIG. 1, for which the positioning and mechanical/electrical interconnections with other elements of the printer 100 will be readily understood and appreciated by one of ordinary skill in the art. The other hardware 134 may include a temperature sensor positioned to sense a temperature of the surface of the build platform 102, the extruder 126, or any other system components. This may, for example, include a thermistor or the like embedded within or attached below the surface of the build platform 102. This may also or instead include an infrared detector or the like directed at the surface 116 of the build platform 102.

In another aspect, the other hardware 134 may include a sensor to detect a presence of the object 112 at a predetermined location. This may include an optical detector arranged in a beam-breaking configuration to sense the presence of the object 112 at a predetermined location. This may also or instead include an imaging device and image processing circuitry to capture an image of the working volume and to analyze the image to evaluate a position of the object 112. This sensor may be used for example to ensure that the object 112 is removed from the build platform 102 prior to beginning a new build on the working surface 116. Thus the sensor may be used to determine whether an object is present that should not be, or to detect when an object is absent. The feedback from this sensor may be used by the controller 110 to issue processing interrupts or otherwise control operation of the printer 100.

The other hardware 134 may also or instead include a heating element (instead of or in addition to the thermal element 130) to heat the working volume such as a radiant heater or forced hot air heater to maintain the object 112 at a fixed, elevated temperature throughout a build, or the other hardware 134 may include a cooling element to cool the working volume.

Figure 2:
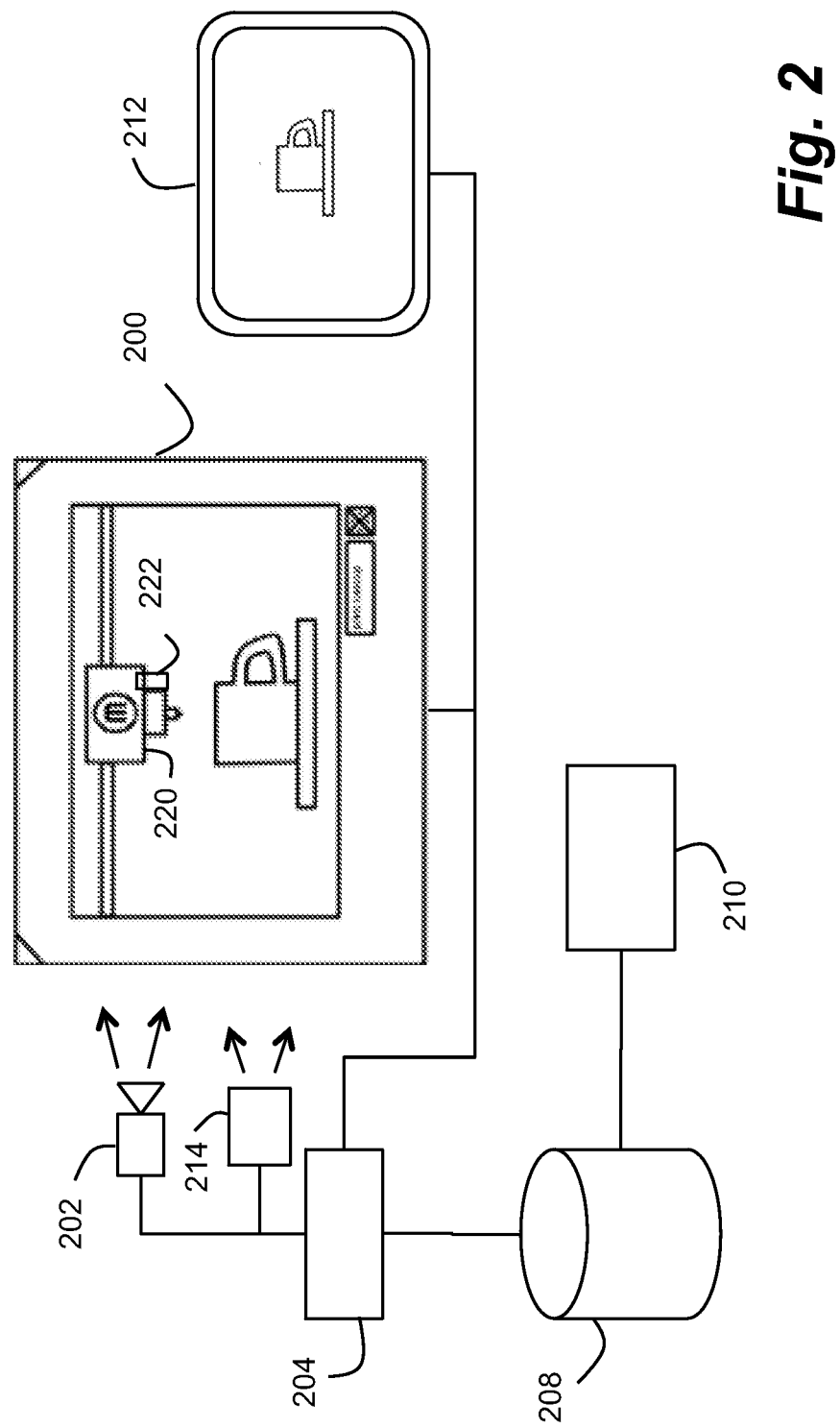
FIG. 2 shows a three-dimensional printer.

FIG. 2 shows a three-dimensional printer. The printer 200 may include a camera 202 and a processor 204. The printer 200 may be configured for augmented operation using two-dimensional data acquired from the camera 202.

The printer 200 may, for example, be any of the three-dimensional printers described above.

The camera 202 may be any digital still camera, video camera, or other image sensor(s) positioned to capture images of the printer 200, or the working volume of the printer 200.

The processor 204, which may be an internal processor of the printer 200, an additional processor provided for augmented operation as contemplated herein, a processor of a desktop computer or the like locally coupled to the printer 200, a server or other processor coupled to the printer 200 through a data network, or any other processor or processing circuitry. In general, the processor 204 may be configured to control operation of the printer 200 to fabricate an object from a build material. The processor 204 may be further configured to adjust a parameter of the printer 200 based upon an analysis of the object in the image. It should be appreciated that the processor 204 may include a number of different processors cooperating to perform the steps described herein, such as where an internal processor of the printer 200 controls operation of the printer 200 while a connected processor of a desktop computer performs image processing used to control print parameters.

A variety of parameters may be usefully adjusted during a fabrication process. For example, the parameter may be a temperature of the working volume. This temperature may be increased or decreased based upon, e.g., an analysis of road dimensions (e.g. height and width of line of deposited build material), or the temperature may be adjusted according to a dimensional stability of a partially fabricated object. Thus, where sagging or other variations from an intended shape are detected, the temperature may be decreased. Similarly, where cooling-induced warping or separation of layers is detected, the temperature may be increased. The working volume temperature may be controlled using a variety of techniques such as with active heating elements and/or use of heated or cooled air circulating through the working volume.

Another parameter that may be usefully controlled according to the camera image is the temperature of a build platform in the working volume. For example, the camera 202 may capture an image of a raft or other base layer for a fabrication, or a first layer of the fabricated object, and may identify defects such as improper spacing between adjacent lines of build material or separation of the initial layer from the build platform. The temperature of the build platform may in such cases be heated in order to alleviate cooling-induced warping of the fabricated object at the object-platform interface.

Another parameter that may be usefully controlled according to an analysis of the camera image is the extrusion temperature of an extruder. By heating or cooling the extruder, the viscosity of a build material may be adjusted in order to achieve a desired material deposition rate and shape, as well as appropriate adhesion to underlying layers of build material. Where roads of material deviate from a predetermined cross-sectional shape, or otherwise contain visible defects, the extrusion temperature of the extruder may be adjusted to compensate for such defects.

Similarly, the parameter may be an extrusion rate of a build material from the extruder. By controlling a drive motor or other hardware that forces build material through the extruder, the volumetric rate of material delivery may be controlled, such as to reduce gaps between adjacent lines of build material, or to reduce bulges due to excess build material.

In another aspect, the parameter may be a viscosity of build material, which may be controlled, e.g., by controlling the extruder temperature or any other controllable element that can transfer heat to and from build material as it passes through the extruder. It will be understood that temperature control is one technique for controlling viscosity, but other techniques are known and may be suitable employed, such as by selectively delivering a solvent or the like into the path of the build material in order to control thermal characteristics of the build material.

Another parameter that may be usefully controlled is a movement speed of the extruder during an extrusion. By changing the rate of travel of the extruder, other properties of the build (e.g., road thickness, spatial rate of material delivery, and so forth) may be controlled in response to images captured by the camera 202 and analyzed by the processor 204.

In another aspect, the parameter may be a layer height. By controlling the z-positioning hardware of the printer 200, the layer height may be dynamically adjusted during a build.

The printer may include a memory 208 such as a local memory or a remote storage device that stores a log of data for an object being fabricated including without limitation a value or one or more of the parameters described above, or any other data relating to a print. The memory 208 may also or instead store a log of data aggregated from a number of fabrications of a particular object, which may include data from the printer 200 and/or data from a number of other three-dimensional printers.

A second processor 210, such as a processor on a server or other remote processing resource, may be configured to analyze the log of data in the memory 208 to identify a feature of the object that is difficult to print. For example, where a corner, overhang, or the like consistently fails, this may be identified by analysis of the log of data, particularly where such failures can be automatically detected based upon analysis of images from the camera 202. Such failures may be logged in any suitable manner including quantitatively as data characterizing the failure (based upon image analysis), meta-data (e.g., percent completion, build parameters, and so forth) and/or a simple failure flag, which may be accompanied by an image of the failed build. In this manner, the second processor 210 can identify features that should be avoided in printable models, and/or objects that are generally difficult or impossible to print. The second processor 210 may also or instead be configured to analyze the results of variations in one or more of the parameters described above. It will be understood that, while the second processor 210 may be usefully located on a remote processing resource such as a server, the second processor 210 may also be the same as the processor 204, with logging and related analysis performed locally by the printer 200 or a locally coupled computer.

The printer 200 may optionally include a display 212 configured to display a view of the working volume. The display 212, which may obtain images of the working volume from the camera 202 or any other suitable imaging hardware, may be configured, e.g., by the processor 204, to superimpose thermal data onto the view of the working volume. This may, for example, include thermistor data or data from other temperature sensors or similar instrumentation on the printer 200. For example, the printer 200 may include sensors for measuring a temperature of at least one of the extruder, the object, the build material, the working volume, an ambient temperature outside the working volume, and a build platform within the working volume. These and any similar instrumentation may be used to obtain thermal data correlated to specific or general regions within and without the printer 200. Where the camera 202 includes an infrared camera, the thermal data may also or instead include an infrared image, or a thermal image derived from such an infrared image.

The display 212 may serve other useful purposes. For example, the view from the camera 202 may be presented in the display. The processor 204 may be configured to render an image of a three-dimensional model used to fabricate an object from the pose of the camera 202. If the camera 202 is a fixed camera then the pose may be a predetermined pose corresponding to the camera position and orientation. If the camera 202 is a moving camera, the processor 204 may be further programmed to determine a pose of the camera 202 based upon, e.g., fiducials or known, visually identifiable objects within the working volume such as corners of a build platform or a tool head, or to determine the pose using data from sensors coupled to the camera and/or from any actuators used to move the camera. The rendered image of the three-dimensional model rendered from this pose may be superimposed on the view of the working volume within the display 212. In this manner, the printer 200 may provide a preview of an object based upon a digital three-dimensional model, which preview may be rendered within the display 212 for the printer, or a user interface of the display, with the as-fabricated size, orientation, and so forth. In order to enhance the preview, other features such as build material color may also be rendered using texture mapping or the like for the rendered image. This may assist a user in selecting build material, scaling, and so forth for an object that is to be fabricated from a digital model.

In another aspect, the printer 200 may optionally include a sensor 214 for capturing three-dimensional data from the object. A variety of suitable sensors are known in the art, such as a laser sensor, an acoustical range finding sensor, an x-ray sensor, and a millimeter wave radar system, any of which may be adapted alone or in various combinations to capture three-dimensional data. The display 212 may be configured to superimpose such three-dimensional data onto the display of the object within the working volume. In this manner, the processor 204 may detect one or more dimensional inaccuracies in the object, such as by comparison of three-dimensional measurements to a digital model used to fabricate the object. These may be presented as dimensional annotations within the display 212, or as color-coded regions (e.g., yellow for small deviations, red for large deviations, or any other suitable color scheme) superimposed on the display of the object. The processor 206 may be further configured to show summary data in the display 212 concerning any dimensional inaccuracies detected within the object.

The sensor 214 may more generally include one or more spatial sensors configured to capture data from the object placed within the working volume. The second processor 210 (which may be the processor 204) may convert this data into a digital model of the object, and the processor 204 may be configured to operate the printer 200 to fabricate a geometrically related object within the working volume based upon the digital model. In this manner, the printer 200 may be used for direct replication of objects simply by placing an object into the working volume, performing a scan to obtain the digital model, removing the object from the working volume, and then fabricating a replica of the object based upon the digital model. More generally, any geometrically related shape may be usefully fabricated using similar techniques.

For example, the geometrically related object may be a three-dimensional copy of the object, which may be a scaled copy, and/or which may be repeated as many times as desired in a single build subject to spatial limitations of the working volume and printer 200. In another aspect, the geometrically related object may include material to enclose a portion of the object. In this manner, a container or other enclosure for the object may be fabricated. In another aspect, the geometrically related object may include a mating surface to the object, e.g., so that the fabricated object can be coupled to the original source object. This may be particularly useful for fabrication of snap on parts such as aesthetic or functional accessories, or any other objects that might be usefully physically mated to other objects. Similarly, a repair piece for a broken object may be fabricated with a surface matched to an exposed surface of the broken object, which surface may be glued or otherwise affixed to the broken object to affect a repair.

The processor 204 may obtain the digital model using, e.g., shape from motion or any other processing technique based upon a sequence of two-dimensional images of an object. The multiple images may be obtained, for example, from a plurality of cameras positioned to provide coverage of different surfaces of the object within the working volume. In another aspect, the one or more spatial sensors may include a single camera configured to navigate around the working volume, e.g., on a track or with an articulating arm. Navigating around the working volume may more generally include circumnavigating the working volume, moving around and/or within the working volume, and/or changing direction to achieve various poses from a single position. The one or more spatial sensors may also or instead include articulating mirrors that can be controlled to obtain multiple views of an object from a single camera.

In another aspect, the one or more spatial sensors 214 may include controllable lighting that can be used, e.g., to obtain different shadowed views of an object that can be interpreted to obtain three-dimensional surface data. The processor 204 (or the second processor 210) may also provide a computer automated design environment to view and/or modify the digital model so that changes, adjustments, additions, and so forth may be made prior to fabrication.

In another aspect, a tool head 220 of the printer may be usefully supplemented with a camera 222. The tool head 220 may include any tool, such as an extruder or the like, to fabricate an object in the working volume of the printer. In general, the tool head 220 may be spatially controlled by an x-y-z positioning assembly of the printer, and the camera 222 may be affixed to and moving with the tool head 220. The camera 222 may be directed toward the working volume, such as downward toward a build platform, and may provide a useful bird's eye view of an object on the build platform. The processor 204 may be configured to receive an image from the camera and to provide diagnostic information for operation of the three-dimensional printer based upon an analysis of the image.

For example, the diagnostic information may include a determination of a position of the tool head within the working volume. The diagnostic information may also or instead include a determination of whether the three-dimensional printer has effected a color change in build material. The diagnostic information may also or instead include a determination of whether the three-dimensional printer has effected a change from a first build material to a second build material. The diagnostic information may also or instead include an evaluation of whether a build material is extruding correctly from the tool head. The diagnostic information may also or instead include an evaluation of whether an infill for the object is being fabricated correctly. In one aspect, the diagnostic information may include the image from the camera, which may be independently useful as a diagnostic tool.

Where the processor 204 is capable of dynamically modifying tool instructions, the processor 204 may be configured to dynamically generate a pattern to infill the object based, for example, on an outline image of the object or previous infilling patterns identified in the image from the camera.

FIG. 3 shows an exploded, cross sectional view of an extrusion head for a three dimensional printer. The extrusion head 300 may include an input port 302 for receiving a build material 304 and an output port 306 having an output port diameter $D_1$. The input port 302 may be in fluid communication with the output port 306 via a chamber 308. In some implementations, fluid communication between the chamber 308 and the output port 306 may occur via a tapered lumen 309. It will be appreciated that the cross-sectional view of FIG. 3 is not necessarily to scale, with an emphasis being instead on the cooperation of various structural features of the disclosed extrusion head.

The input port 302 (or separate structure on the input end of the extrusion head 300) may include a coupling, such as a threaded surface, lip/flange, or the like for coupling the extrusion head to another structure of a three dimensional printer.

A heating element 310 may be thermally coupled to one or more walls 311 of the chamber 308. While depicted as an external mechanical coupling, it will be appreciated that the heating element 310 may also or instead be embedded within the wall 311 or otherwise attached thereto in any manner that provides thermal coupling therebetween. The heating element 310 may be controlled to apply heat to one or more walls 311 of the chamber (and possibly build material 304 therein), thereby helping to attain an ambient temperature at which the build material may liquefy. In some implementations, the extrusion head may be constructed from a metal, for example (and without limitation) brass.

The extrusion head 300 may include a coupling 312, by which an output nozzle 314 can removably and replaceably couple to the extrusion head 300 via a nozzle coupling 316. In general the couplings 312, 316 can be of any form suitable for removably and replaceably coupling the nozzle 314 to the extrusion head 300. In some implementations, the couplings 312, 316 are fluid-tight, such that liquefied build material 304 is unlikely to escape at the interface between couplings 312, 316 during normal use of the three dimensional printer. Further, it will be understood that extrusion processes for viscous materials such as liquid ABS or PLA can require substantial pressure, and as such the couplings 312, 316 should join the extrusion head 300 to the nozzle 314 with sufficient tenacity to withstand corresponding pressure in the chamber 308.

The nozzle 314 may have an output diameter $D_2$ at its distal opening (to the extrusion head 300), which in some implementations may be smaller than the diameter $D_1$ of the output port 306 in the extrusion head 300. The distal opening may be formed by one end of a hole 318 through the output nozzle 314. This hole 318 may bear any desired geometry corresponding to any desired output shape for an extrusion of build material. For example and without limitation the hole 318 may bear a cylindrical geometry (i.e., with a circular cross section), or may be taper from a relatively large opening on a proximal side of the nozzle 300 (i.e., where the nozzle interfaces with the extrusion head 300) to a relatively small opening on the distal side.

Although the term "diameter" is used to describe certain structures, in general these structure need not be circular in cross section. For example (and without limitation), one or more of these structures may bear a circular, rectangular, polygonal, or piece-wise curvilinear cross-sectional geometry. In the case of non-circular cross sectional geometries, the term "diameter" may denote a maximum, minimum, mean, or other specific cross-sectional measure of length.

The output nozzle 314 may be formed from a material that is mechanically stable at the liquid transition temperature of the build material. In some implementations, the output nozzle 314 may be constructed of a material including a plastic, a ceramic, a metal (including shape memory alloy), polymer, engineered glasses (including those sold under the trademark PYREX), or the like. The material from which the nozzle 314 is constructed need not be the same as the material from which the extrusion head 300 is constructed. However, these materials may be usefully selected to have identical or substantially similar coefficients of thermal expansion, thereby helping to maintain an adequate coupling between the nozzle 314 and the extrusion head 300. In this context, thermal expansion coefficients may be said to be "substantially identical" or to "match" when they are within a predetermined tolerance of each other, with the tolerance possibly depending on the type of couplings 312, 316 being used, the dimensions of the extrusion head 300 and the nozzle 314, the range of thermal exposure, or other factors.

In some implementations, the output nozzle 314 may bear a unitary construction—that is, it may be constructed as a single, integral structure. In some implementations, the nozzle 314 may include insulation such as an insulating coating about its exterior. Such a coating may advantageously help retain heat from the heating element 310 within an interior surface of the nozzle 314 (and more generally, within a melt zone of the chamber 308 where material is to be liquefied), or may advantageously mitigate the risk of burning if a person accidentally touches the nozzle 314 when it may not otherwise be safe to do so.

In some implementations, the coupling 312 of the extrusion head may include a flange, and the coupling 316 may include a lip dimensioned to mate with the flange in order couple the nozzle 314 to the extrusion head 300. In some implementations the flange is constructed of a material that is sufficiently resilient to allow the nozzle 314 and extrusion head 300 to be securely engaged during operation of a three dimensional printer, yet sufficiently pliable to allow the extrusion head 300 and the nozzle 314 to be disengaged by hand. Equivalently, the lip and flange may be reversed, with coupling 316 including the flange, and coupling 312 including the lip.

In some implementations, the couplings 312 and 316 may include compatibly threaded surfaces, so that the nozzle 314 may be threadably coupled to the extrusion head 300 via the couplings 312 and 316. Although the couplings 312 and 316 are schematically shown as separate structures in FIG. 3, in some implementations one or both couplings 312, 316 may be incorporated into other components of the structures 300, 314. For example, the output port 306 and an interior surface 320 of the nozzle may each include threaded areas, permitting the nozzle 314 to threadably couple to the extrusion head 300. Similarly, the coupling 316 of the nozzle 314 may also or instead removably and replaceably couple to other components of a three-dimensional printer such as any hardware that is coupled in a fixed relationship to the extrusion head 300. Thus for example, the coupling 316 may attach to a mount or robotic component of an x-y-z gantry or the like that controls position of the extrusion head 300 during an extrusion process. Regardless of how and where attached, the coupling 316 should secure the nozzle 314 to the extrusion head 300 with sufficient tenacity to withstand displacement under loads or pressures anticipated from an extrusion process.

FIG. 4 shows an exploded cross-section of an extrusion head for a three dimensional printer. In some implementations, an extrusion head 400 may be substantially included in a fixture 418. For example, the fixture 418 may advantageously be employed to mitigate the risk of injury by accidental contact with hot components of the extrusion head 400, to provide insulation that retains heat within internal thermal components, to provide a mounting surface for the extrusion head 400 to a gantry or the like, or for any other functional or aesthetic purposes. In some implementations, the fixture 418 may include an opening for the output port 406 of the extrusion head.

In such embodiments, a nozzle 414 may couple to the fixture 418 via couplings 412 on the fixture and couplings 416 on the nozzle. The couplings 412, 416 may be as described above.

As described above, a nozzle that can removably and replaceably couple to the extrusion head enjoys certain advantages. For example, it is often easier to clean the nozzle of excess build material after a print job if the nozzle can be removed from the extrusion head. Moreover, in the event of an error that is sufficiently difficult to clean, the nozzle itself may be discarded and replaced. This is cheaper for the end user than discarding and replacing the entire extrusion head.

While particular embodiments of the present invention have been shown and described, it will be apparent to those skilled in the art that various changes and modifications in form and details may be made therein without departing from the spirit and scope of this disclosure and are intended to form a part of the invention as defined by the following claims, which are to be interpreted in the broadest sense allowable by law.

What is claimed is:

1. A device comprising:
an extrusion head for extruding a thermoplastic, the extrusion head formed of a first material including a metal having a first coefficient of thermal expansion, the extrusion head including a first end with an input port to receive a build material having a liquid transition temperature and a second end with an output port having a first diameter, the input port coupled in fluid communication with the output port by a chamber;

a heating element thermally coupled to the chamber, the heating element configured to apply heat to a wall of the chamber and liquefy the build material in the chamber; and an output nozzle formed of a second material different from the first material, the second material including one or more of a plastic, a ceramic, and a shape memory alloy each having a second coefficient of thermal expansion matched to the first coefficient of thermal expansion and selected such that the output nozzle is mechanically stable at the liquid transition temperature of the build material, the output nozzle having an opening with second diameter less than the first diameter, the opening shaped according to a desired extrusion shape, and the output nozzle being constructed as a single, integral structure that is removably and replaceably coupled to the output port of the extrusion head.

2. The device of claim 1 wherein the extrusion head includes a flange on an exterior surface.

3. The device of claim 2 wherein the output nozzle includes a lip positioned to engage the flange when the output nozzle is coupled to the extrusion head, thereby securely and removably engaging the output nozzle to the extrusion head.

4. The device of claim 1 wherein the extrusion head is formed of brass.

5. The device of claim 1 wherein the first end of the extrusion port is threaded to threadably couple to a three-dimensional printer.

6. The device of claim 1 wherein the second end of the extrusion head is threaded.

7. The device of claim 6 wherein the output nozzle is threadably coupled to the second end of the extrusion head.

8. The device of claim 1 wherein the output nozzle is removably and replaceably attached to a fixture that retains the extrusion head.

9. The device of claim 1 wherein the chamber is coupled to the output port of the extrusion head by a tapered lumen.

10. The device of claim 1 wherein the opening forms a cylindrical hole through the output nozzle.

11. The device of claim 1 wherein the opening is tapered from a larger opening on a first side of the output nozzle proximal to the extrusion head to a smaller opening on a second side of the output nozzle distal to the extrusion head.

12. The device of claim 1 further comprising a supply of the build material in filament form coupled to the input port.

13. The device of claim 1 further comprising a three-dimensional printer containing the extrusion head.

14. The device of claim 1 wherein the opening has a circular cross-sectional shape.

15. The device of claim 1 further comprising an insulating material on an exterior of the output nozzle, the insulating material positioned to retain heat from the heating element within an interior surface of the output nozzle.

16. The device of claim 1 wherein the second material includes material that expands substantially uniformly in response to applied heat.

* * * * *